(12) United States Patent
Koo

(10) Patent No.: US 11,646,804 B2
(45) Date of Patent: May 9, 2023

(54) LIGHT-BASED DATA ENCODING AND/OR DECODING DEVICE

(71) Applicant: John C. S. Koo, Los Angeles, CA (US)

(72) Inventor: John C. S. Koo, Los Angeles, CA (US)

( * ) Notice: Subject to any disclaimer, the term of this patent is extended or adjusted under 35 U.S.C. 154(b) by 452 days.

(21) Appl. No.: 16/926,835

(22) Filed: Jul. 13, 2020

(65) Prior Publication Data

US 2021/0044377 A1 Feb. 11, 2021

Related U.S. Application Data

(60) Provisional application No. 62/883,555, filed on Aug. 6, 2019.

(51) Int. Cl.
| | | |
|---|---|---|
| *H04B 10/85* | (2013.01) | |
| *H04L 9/06* | (2006.01) | |
| *H04B 10/116* | (2013.01) | |

(52) U.S. Cl.
CPC ........... *H04B 10/85* (2013.01); *H04B 10/116* (2013.01); *H04L 9/0656* (2013.01)

(58) Field of Classification Search
None
See application file for complete search history.

(56) References Cited

U.S. PATENT DOCUMENTS

| | | | |
|---|---|---|---|
| 8,699,887 B1 | 4/2014 | Rothenberg | |
| 8,812,917 B2 | 8/2014 | Paumier | |
| 10,090,859 B2 | 10/2018 | Ko et al. | |
| 2007/0008258 A1* | 1/2007 | Yamamoto | H04B 10/1149 345/83 |
| 2010/0074444 A1* | 3/2010 | Etemad | H04B 10/85 380/42 |
| 2010/0183309 A1* | 7/2010 | Etemad | H04J 14/007 398/79 |
| 2015/0043677 A1* | 2/2015 | Conway | H03M 7/6052 375/296 |
| 2017/0170846 A1* | 6/2017 | Ikegaya | H03M 13/1185 |
| 2017/0353302 A1* | 12/2017 | Fernandez | H04L 9/16 |
| 2018/0375696 A1* | 12/2018 | Sadiq | H04L 25/03866 |

FOREIGN PATENT DOCUMENTS

| | | |
|---|---|---|
| JP | 4976107 B2 | 7/2012 |
| WO | WO 2010/061184 A1 | 6/2010 |

* cited by examiner

*Primary Examiner* — David W Lambert
(74) *Attorney, Agent, or Firm* — Loza & Loza, LLP; Joseph G. Swan

(57) ABSTRACT

Provided is a data-coding apparatus that includes: a data-input line for receiving input data; a data scrambler having light sources coupled to the data-input line and modulated in accordance with the input data, and light sensors that receive light from the light sources; and at least one light-sensing processor coupled to the light sources and configured so as to selectively isolate light signals received from individual ones of the light sources based on at least one control signal input into such data scrambler. The light-sensing processor is dynamically controlled by the control signal(s) so as to rearrange words within the input data according to patterns that change in real time.

16 Claims, 3 Drawing Sheets

US 11,646,804 B2

LIGHT-BASED DATA ENCODING AND/OR DECODING DEVICE

This application claims the benefit of U.S. Provisional Patent Application Ser. No. 62/883,555, filed on Aug. 6, 2019, which application is incorporated by reference herein as though set forth herein in full.

FIELD OF THE INVENTION

The present invention pertains, among other things, to systems, apparatuses, methods and techniques for coding (i.e., encoding and/or decoding) data, e.g., for security purposes.

BACKGROUND

A variety of different data encoding/decoding approaches exist. However, improvements in such existing approaches still are desirable, particularly in relation to security, as well as speed of the coding operation.

SUMMARY OF THE INVENTION

In one respect, the present invention addresses the foregoing need by providing a light-based device that can perform parallel scrambling of input data (e.g., scrambling the data words, each including one or more data bits, within a specified data block).

More specifically, one embodiment of the invention is directed to a data-coding apparatus that includes: a data-input line for receiving input data; a data scrambler having light sources coupled to the data-input line and modulated in accordance with the input data, and light sensors that receive light from the light sources; and at least one light-sensing processor coupled to the light sources and configured so as to selectively isolate light signals received from individual ones of the light sources based on at least one control signal input into such data scrambler. The light-sensing processor is dynamically controlled by the control signal(s) so as to rearrange words within the input data according to patterns that change in real time.

Another embodiment is directed to a communication system, that includes: a security service server having a first network interface that is configured for communicating across a network; and a decoder having an input that receives encoded data, a second network interface that is configured for communicating across the network, and an output that provides decoded data corresponding to the received encoded data. The decoder receives at least one code from the security service server and then uses such code(s) to decode the received encoded data and thereby provide the corresponding decoded data.

In any of the embodiments discussed herein (e.g., those summarized above):
- the code(s) specify different rearrangement patterns for data words contained in corresponding different blocks of the encoded data;
- the different blocks have different sizes, including different quantities of data, and the different sizes also are specified by the code(s);
- the different blocks are nonoverlapping;
- the decoder receives the encoded data across a real-time communication channel;
- the decoder retrieves the encoded data from a storage device on which the encoded data previously had been stored;
- the code(s) comprise a stream of data that includes a sequence of descrambling codes specifying how to rearrange data words within the received encoded data;
- the stream of data specifies different parameters for decoding the received encoded data;
- the decoder uses the code(s) as a seed for a pseudorandom number generator which, in turn, provides a pseudorandom stream of data that includes a sequence of descrambling codes specifying how to rearrange data words within the received encoded data;
- the seed for the pseudorandom number generator is updated over time by the security service server;
- the (e.g., pseudorandom) stream of data is divided into segments in a predetermined manner, with individual ones of the segments specifying different parameters for decoding the received encoded data;
- the different parameters include definitions of blocks and specification of the descrambling codes to be used within the blocks;
- the descrambling codes identify descrambling tables used by the decoder;
- the descrambling codes identify sequences of descrambling functions to be used by the decoder; and/or
- upon receiving the encoded data, the decoder submits a request to the security service server across the network, via the second network interface, and in response, receives the at least one code.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the accompanying drawings. However, it should be understood that the drawings merely depict certain representative and/or exemplary embodiments and features of the present invention and are not intended to limit the scope of the invention in any manner. The following is a brief description of each of the accompanying drawings.

DESCRIPTION OF THE PREFERRED EMBODIMENT(S)

Aspects of the present disclosure are related to the disclosure of U.S. patent application Ser. No. 16/890,119, filed on Jun. 2, 2020 (the '119 application), which is incorporated by reference herein as though set forth herein in full.

For ease of reference, the present disclosure is divided into sections. The general subject matter of each section is indicated by that section's heading. However, such headings are included simply for the purpose of facilitating readability and are not intended to limit the scope of the invention in any manner whatsoever.

Preferred System Configuration

Figure 1:
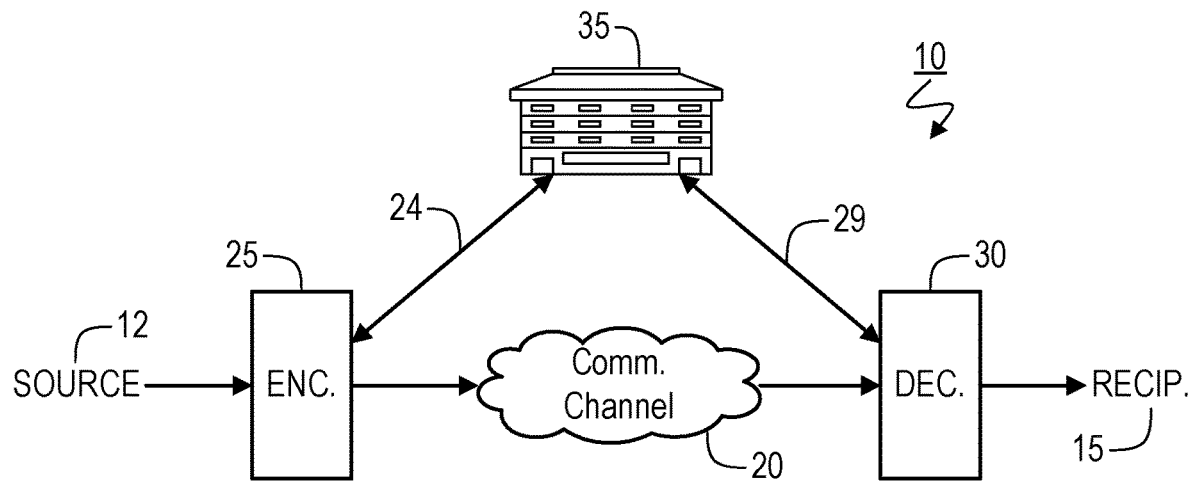
FIG. 1 is a block diagram of a communication system according to a representative embodiment of the present invention.

FIG. 1 is a block diagram of a communication system 10 according to a representative embodiment of the present invention. As shown, in system 10 a source 12 sends, communicates or otherwise provides data to a recipient 15 via a communication channel 20. Prior to such communication, however, the data to be transmitted are first encoded, in certain embodiments based on control signal(s) 24 received from a security service server 35, in an encoder 25. Then, at the recipient's side, the received data are decoded, based on corresponding control signal(s) 29, preferably received from the security service server 35, in a decoder 30 before being provided to the recipient 15.

Although only one-way communication is shown in FIG. 1, that depiction is intended solely to simplify the illustration by portraying just a single instance of data transfer. In actual implementation, any given entity can be both a source 12 and a recipient 15, either alternately or simultaneously. Preferably, the encoder 25 and the decoder 30 are structurally identical to each other, so that the same device can be used for encoding and/or decoding, e.g., depending only upon the types of control and/or configuration signals provided to such device. More preferably, an encoder/decoder (25 and/or 30) according to the present invention preferably is, or includes, a general-purpose or a special-purpose processor (as discussed in greater detail below), programmed or otherwise configured to perform the steps described for such a device herein.

Also, it is noted that the communication channel 20 can be (or include) a real-time communication channel (or network), such as a radio-signal link, an optical link, a local area network, a wide area network and/or the Internet. In addition, or instead, communication channel 20 can be (or include) a storage device, e.g., that can be used by the recipient 15 to retrieve, on demand, data that previously have been stored by the source 12.

In the present embodiment, one purpose of the encoding/decoding in system 10 is to provide security for the data communicated through channel 20. For this purpose, in certain embodiments a security service server 35 provides the code(s) 24 to the encoder 25 and the preferably corresponding code(s) 29 to the decoder 30, for use in the corresponding encoding/decoding operations. As discussed in greater detail below, depending upon the particular embodiment, these codes 24 and 29 can be:

identical to each other, or one can be derivative of the other;

provided either directly or indirectly to the corresponding devices 25 and 30; and/or provided on a one-time basis, updated periodically or transmitted continuously.

It should be noted that the decoding code(s) 29 preferably are provided by the security service server 35 to the decoder 30. However, rather than being provided by the security service server 35 to the decoder 30, in certain embodiments the encoding code(s) 24 are generated by the source 12's encoder 25 (or other hardware associated with the source 12), and then: (i) such code(s) 24 are provided to the security service server 35, or (ii) the source 12 provides other information to the security service server 35 that is sufficient for the security service server 35 to generate the decoding code(s) 29.

Also, depending upon the particular embodiment, the code(s) 24 and/or 29, e.g., are provided: (1) by the security service server 35 on an automated basis (e.g., on a regular or periodic basis, which can be particularly useful in connection with real-time communications); and/or (2) upon request (e.g., with the decoder 30 requesting the corresponding decoding code(s) 29 when it is ready to decode particular, e.g., pre-stored data, e.g., based on an identification code embedded or otherwise included within such data and/or by also submitting an identification code associated with the decoder 30 and/or a larger device of which it is a part). In any event, additional security often can be achieved by limiting the devices to which the code(s) 24 and/or 29 are provided.

Figure 2:
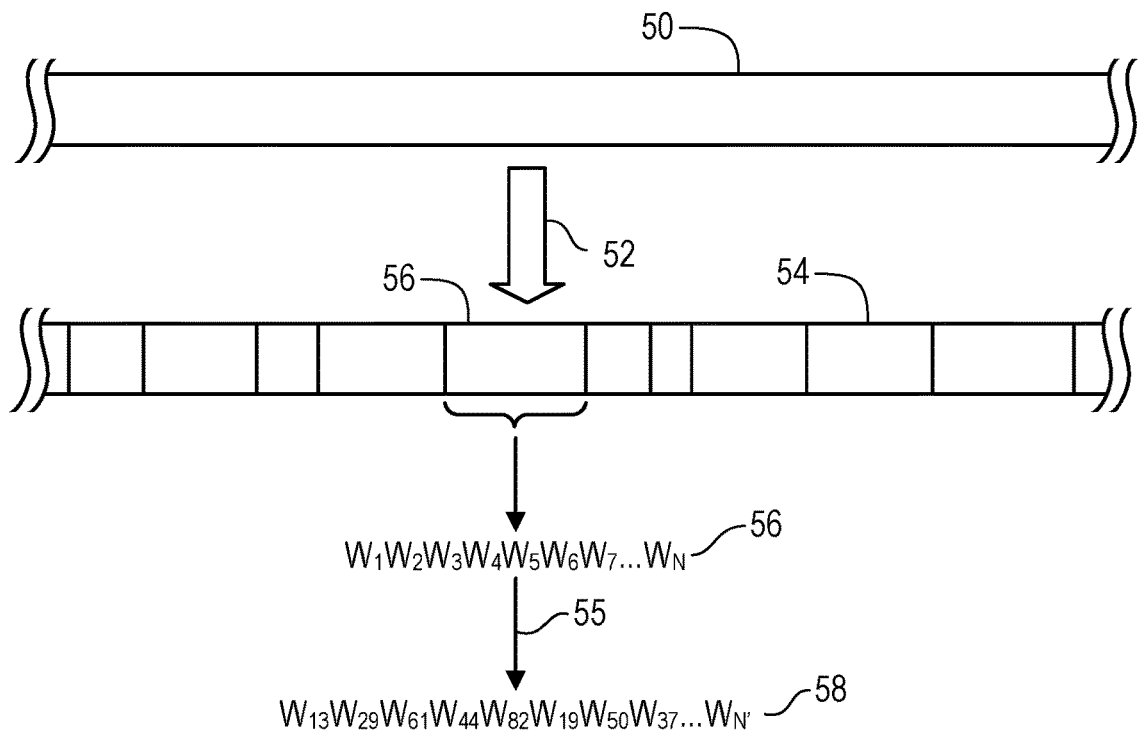
FIG. 2 is a combination block/flow diagram showing the encoding of a data stream according to a representative embodiment of the present invention.

One representative embodiment of the processing performed by encoder 25 is shown in FIG. 2. Here, a stream of input data 50 is received by the encoder 25 from the source 12.

Initially, in step 52 encoder 25 divides this data stream 50 into a set of blocks, resulting in a divided data stream 54. In the present embodiment, the data blocks are contiguous and non-overlapping. However, in alternate embodiments, at least some of the adjacent blocks at least partially overlap each other, e.g., as discussed in greater detail below. Also, in the current embodiment, the blocks are non-uniform in width (i.e., with different blocks typically having different lengths or sizes, or containing different quantities of data). However, in alternate embodiments, uniformly sized data blocks are used. Each such block contains a corresponding number of data words (e.g., a fixed number for blocks of uniform width or a variable number for blocks of non-uniform width, in either case, e.g., within a range of 10-1,000 such data words within each block). In the current embodiment, each such data word has the same length (e.g., a fixed length of 1-1,024 bits each) as the others. However, in alternate embodiments, the data words have unequal lengths (e.g., varying lengths within a range of 1-1,024 bits each). Depending upon the particular embodiment, each of the foregoing parameters may be established in advance (e.g., predetermined or based on user settings) or else may be established (e.g., on the fly) based on the code(s) 24 provided by the security service server 35 (e.g., to provide varying levels of security).

Each of the foregoing variations (and combinations of such variations) has different advantages that will be desirable in a correspondingly different situation. In the current embodiment, the size of each block is determined by such code(s) 24, while the length of each data word is fixed in advance and identical across all blocks. Similarly, in the current embodiment, the decision to use nonoverlapping data blocks has been established in advance.

Figure 3:
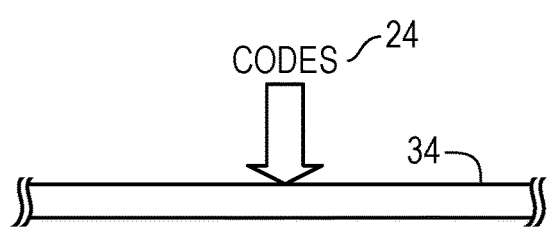
FIG. 3 is a block diagram showing the direct use of control codes from a security service as a control data stream.
Figure 4:
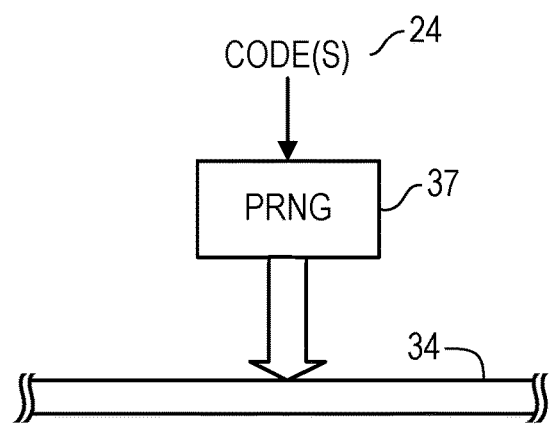
FIG. 4 is a block diagram showing the use of a control code from a security service to generate a control data stream.

As a result of these design choices, in terms of data-structure parameters, in the current embodiment a stream of control data 34 (shown, in relation to different embodiments, in FIGS. 3 and 4) specifies just the sizes of the data blocks, for use in dividing the input data stream 50 into data stream 54, along with the scrambling codes for such data blocks. As shown in FIG. 3, in one set of embodiments control data stream 34 is provided directly by security service server 35, i.e., sent by security service server 35 as codes 24. In other embodiments, as shown in FIG. 4, a single code 24 is provided by security service server 35, either on a one-time basis or updated on a relatively infrequent basis, and that code 24 (or each new code 24) is used as a seed for a pseudorandom number generator 37 which, in turn, provides a pseudorandom stream of data that is used as control data stream 34. In the preferred embodiments, pseudorandom number generator 37 uses any one of the conventional cryptographically secure pseudorandom-number-generation techniques. The resulting control data stream 34 in this embodiment preferably is then divided into segments according to a predetermined segmentation approach, known to both the encoding side and the decoding side, in order to provide the desired control information.

Figure 5:
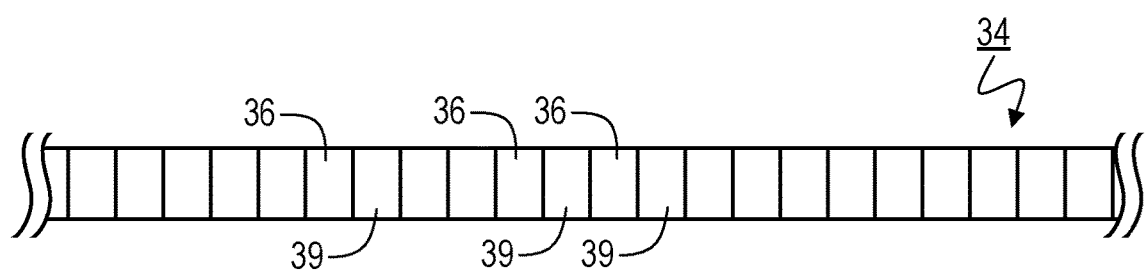
FIG. 5 illustrates a control data stream divided into segments for specifying block sizes and scrambling code for an input data stream.

For example, in the current embodiment, in which the only additional information specified are the block sizes of the input data stream 50, each such data block might be permitted to have a size of 10-137 words, i.e., 128 possibilities that can be represented by 7 bits. As a result, pseudorandom block sizes can be obtained by simply dividing the control data stream 34 into sequential 7-bit segments, such as shown in FIG. 5. Then, the first 7 bits in the control data stream 34 are deemed to represent the size 36 of the first block of input data stream 50, the second 7 bits represent the scrambling code 39 for the first block, the third 7 bits represent the size 36 of the second block, the fourth 7 bits represent the scrambling code 39 for the second block, and so on. The most straightforward way to identify block size in this example is to simply add 10Base 10 to the binary number represented by the corresponding 7 bits. However, any other method instead may be used. Also, it should be noted that, in alternate embodiments, the block sizes 36 and scrambling code 39 have different bit lengths.

Similarly, if additional control information is desired, it too can be pseudo-randomly specified by dividing up the resulting control data stream 34 in a different predetermined manner. That is, the same approach can be used with regard to any desired control signals, i.e., having fixed segments of the data stream 34 representing different parameters, e.g., block size (if variable), amount of block overlap (if any), word size (if variable), rearrangement code(s) (specifying how the data words within the block are to be scrambled or rearranged), etc. If both the encoder 25 and the decoder 30 use the same data stream 34 and interpret it according to the same pattern, effective communications (e.g., encoding/decoding) can occur. This is a useful approach, particularly when the data stream is pseudo-randomly generated.

In alternate embodiments, rather than using fixed-length blocks, the data stream provided by security service server 35 includes headers to identify the types of codes that are being presented. This alternate approach typically is best suited to real-time communications of the control data stream 34 from the security service server 35.

As will be readily apparent, generating the block sizes and/or other control information as a pseudorandom stream based on a single code 24 (which may be updated from time to time) usually is preferable because such an approach does not require a real-time connection to security service server 35, as well as involving far less transfer of data overall. Nevertheless, in some embodiments it might be preferable to provide such a continuous stream of data from security service server 35 to the encoder 25, e.g., for additional security.

As indicated above, the control data stream 34 preferably includes different kinds of codes. Depending on the particular embodiment, such codes within control data stream 34 specify, e.g.: i) how the data stream is to be divided up into blocks (e.g., identifying a block width BW for each of a specified number of blocks); ii) the word length WL within each block; iii) whether and to what extent the blocks overlap each other (e.g., for each block, the number of words it overlaps with the preceding block, which can be referred to as the overlap length OL); and iv) the pattern to be used for scrambling the words within each block, which can be referred to as the scramble pattern SP. In certain embodiments, such codes are provided sequentially for each block, in a repeating pattern, such as BW1, WL1, OL1, SP1, BW2, WL2, OL2, SP2, . . . , where the subscript denotes the corresponding block number. Alternatively, any of these parameters might be fixed across all blocks and specified just at the beginning of the control data stream 34, or permanently fixed so that there is no need to specify a value for such parameter(s) within control data stream 34.

As noted above, in certain embodiments, all of this information is streamed in real time by security service server 35. In other embodiments, the information is provided as a random data stream (e.g., generated in accordance with one or more seed codes provided by security service server 35), e.g., with the decoding pattern established in advance. For example, in one embodiment, the random data stream is divided into fixed-length words (having a pre-specified bit length), with the first 50 words specifying the lengths and amounts of overlap for the first (or next) 50 blocks and the next 50 words specifying the respective scrambling patterns for such blocks, with this pattern repeating indefinitely so as to encompass any number of 50-block segments, and with the random data stream transitioning to a new data stream each time a new seed code is received from security service server 35.

Referring again to FIG. 2, it is noted that in still further embodiments, data-stream-segmentation step 52 is omitted entirely or simply uses existing segmentation within the stream of input data 50. This might be the case, e.g., where the original data stream 50 previously has been divided into blocks, such as frames of audio data or blocks of image data. Depending upon the particular embodiment, in such cases, the processing according to the present invention either uses these existing blocks or re-divides the data stream 50 into blocks of other sizes (uniform or non-uniform).

Next, in step 55 encoder 25 scrambles or rearranges the data words contained within each block of the divided data stream 54. A sample block 56, shown in FIG. 2, illustrates this operation. Block 56 includes N words (e.g., each representing a different code or parameter, such as any of BW, WL or SP for a given block), labeled sequentially from 1 to N. Based on the scramble codes 39 within control data stream 34 (e.g., as shown in FIG. 5), those words are (preferably pseudo-randomly) rearranged within the block, resulting in an encoded block 58. As shown in FIG. 5, in the current embodiment the scramble code 39 for each block immediately follows the code 36 for that block's length in the control data stream 34. In the preferred embodiments, the data words within different blocks in the original divided data stream 54 are rearranged or scrambled in a different ways (i.e., different word-scrambling patterns applied to different blocks).

As indicated above, in the preferred embodiments a separate code 39 is provided for each block 56 of data in the input data stream 50, specifying how the words within that block 56 are to be scrambled. Such data scrambling in step 55 can be performed in any of a variety of different ways based on the provided code 39. Probably the most direct is to predefine a set of scrambling tables, one corresponding to each unique code 39, with each such table specifying how the data words within the corresponding block 56 to which the code 39 applies are to be rearranged. For example, for fixed-sized blocks, each including 100 data words, in this embodiment each such table can be implemented as a random or pseudorandom arrangement of the numbers 1 to 100, with the number in the first position indicating the location to which the first data word in the input data stream 50 is to be moved, the number in the second position indicating the location to which the second data word in the input data stream 50 is to be moved, and so on. A benefit of this approach is that it can be very fast and straightforward to implement. However, such an approach can require a significant amount of storage for all the scrambling tables that are intended to be used and can be difficult to implement when different data blocks 56 have different sizes.

Accordingly, in alternate embodiments, the scrambling pattern is generated on-the-fly based on the scrambling corresponding scrambling codes 39. One approach in this regard is to define a set of elemental scrambling functions and then use each block's scrambling code 39 to determine which ones to apply to that block.

For instance, one elemental scrambling function is to swap every odd data word with the data word immediately following it (so that word 1 is swapped with word 2, word 3 is swapped with word 4, and so on). More generally, a scrambling function can be defined such that each data word at position N is swapped with the data word at position N+k, where k is an arbitrarily specified integer, and where the data words within each block 56 are deemed to wrap for purposes of this operation, so that, e.g., if k=2, then the last word in the block 56 is swapped with the second word in the block 56. Each such elemental scrambling function can be defined so that once a word has been swapped it is not swapped again in that function (e.g., so that if word 1 is swapped with word 3, then the function does not subsequently swap word 3 with word 5. In other embodiments, a single word can be swapped multiple times when performing the function.

Other potential functions include, e.g.: shifting the entire string of words by k position(s) to the right; shifting the entire string of words by k position(s) to the left; and/or performing a predefined rearrangement operation (e.g., using a predefined scrambling table) on consecutive smaller sub-blocks within the overall block 56. In any event, in the current embodiments, a sequence of elemental scrambling functions is defined, and then such elemental scrambling functions are applied in the corresponding order, except that each is applied if the corresponding bit of the scrambling code 39 for the current block 56 is 1 (and is not applied if the corresponding bit is 0). Preferably, in order to handle the data words at the beginning and/or end of the block 56, simple data wrapping or any other predefined approach is used with respect to position indexes that otherwise would exceed the range of the block 56.

It is noted that this approach can be implemented by actually sequentially applying the applicable elemental scrambling functions, as specified by the scrambling code 39, to the data words in the corresponding block 56. Alternatively, a scrambling table can be generated on-the-fly by sequentially applying such applicable elemental scrambling functions, and then that resulting scrambling table is then applied to the corresponding current block 56. This latter approach can be particularly useful, e.g., in connection with the embodiment described below in connection with FIGS. 3 and 4.

Once encoded in accordance with the present invention, the data stream is made available to the recipient 15 via communication channel 20 which, as noted above, can comprise a real-time communication channel and/or a storage medium. Upon receipt, based on the control data stream 34 generated from code(s) 29, decoder 30 first performs step 52, in order to divide the incoming data stream into the same blocks that were used by encoder 25, and then performs step 55 to descramble the data words in each block, using rearrangement patterns that are the reverse of those used by encoder 25. Because essentially the same information is being used in the decoding process, the control data stream 34 generated from code(s) 29 preferably is identical or complementary to the control data stream 34 generated from code(s) 24). If identical, step 52 in decoder 30 is identical to step 52 in decoder 25, and either: pre-stored descrambling tables in decoder 30 are the reverse of the scrambling tables used in encoder 25; or the elemental descrambling functions used in decoder 30 are the reverse of the elemental scrambling functions used in encoder 25, and they are performed in the opposite order (with the scramble code 39 being read in the reverse order to identify which elemental descrambling functions to apply). If complementary, the corresponding information is extracted from code(s) 29 an/or the resulting control data 34 in order to perform such identical divide in step 52 and such reverse data-word rearrangement operation(s).

As noted above, codes 24 and 29 are related to each other, and both preferably are updated over time by security service server 35, so that decoder 30 uses the code 29 to decode information that has been encoded using the corresponding code 24. For additional security, in the preferred embodiments codes 24 and 29 are encrypted, e.g., using any conventional technique.

Representative Encoders and Decoders.

Figure 6:
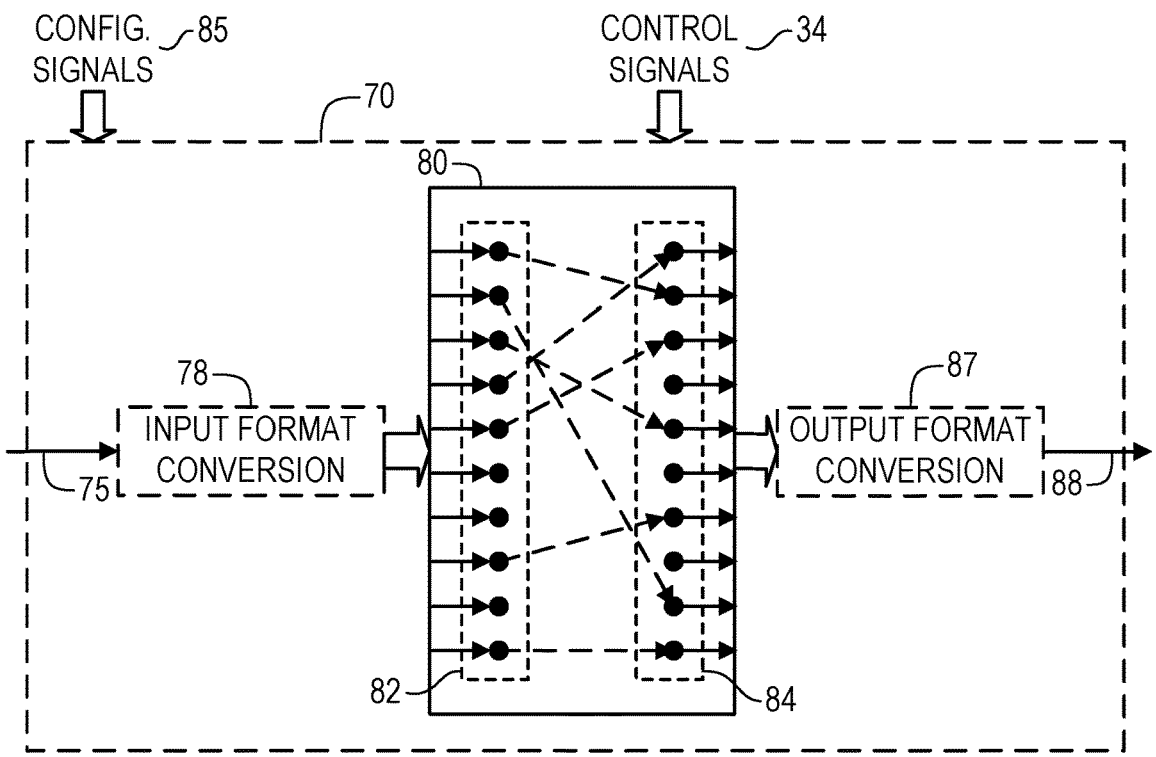
FIG. 6 is a block diagram of an encoder/decoder according to a representative embodiment of the present invention.
Figure 7:
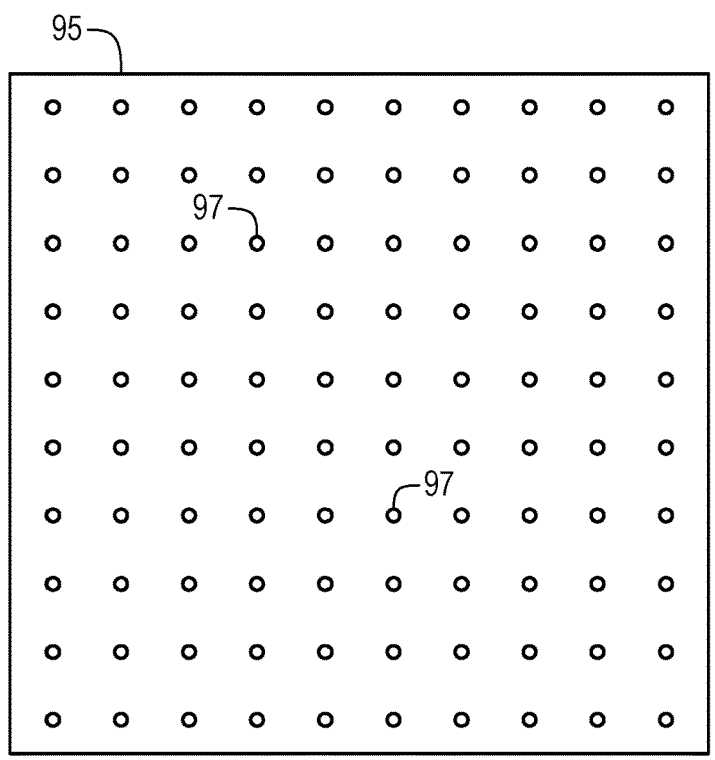
FIG. 7 is a top plan view of an optical array for use in an encoder/decoder according to a representative embodiment of the present invention.

One embodiment of a coder 70 is now discussed in reference to FIGS. 6 and 7. A coder 70 may be used as the encoder 25 or the decoder 30. Structurally, the encoder 25 and the decoder 30 are identical in this embodiment. Only the processing performed by each varies somewhat, as discussed in greater detail elsewhere herein.

FIG. 6 is a block diagram of a coder 70 used in this embodiment. Its input line 75 is coupled to the signal source 12 and provides the input signal that is to be processed by coder 70. Optionally, the input signal first is processed by an input format converter 78 (which, depending upon the specific embodiment, is implemented with a special-purpose or a programmed general-purpose processor) in order to match the input signal's format to that used by scrambler 80, typically as specified by control signals 34 (which in turn are generated by code(s) 24 if coder 70 is being used as encoder 25 or by code(s) 29 if coder 70 is being used as decoder 30). In this regard, block scrambler 80 (discussed in greater detail below) typically has a fixed or maximum block size, and the control signals 34 are used in certain embodiments to specify the length and/or starting point of each block 56 be processed by scrambler 80 (e.g., as discussed above).

More specifically, in the current embodiment the input signal (provided on input line 75) is a serial bitstream, and the input format converter 78 functions as a configurable serial-to-parallel converter, grouping strings of bits or words into blocks, which are then output in parallel to be processed by scrambler 80. The data blocks output by scrambler 80 optionally are then converted into a desired output format (e.g., a serial data stream in the present embodiment, in order to match the format of the input signal) by output format converter 87, before being provided to output line 88.

In the current embodiment, scrambler 80 includes a set 82 of light sources (each preferably including one or more light-emitting diodes and a processor, e.g., for modulating the signal provided to the LED) and a set 84 of light-sensing circuits (each preferably including a light sensor and a processor for processing the received light so as to isolate the light from a single light source). Preferably, coder 70 includes at least 25, 50, 75 or 100 light sources 82 and light sensors (or light-sensing circuits 84), typically, the same number of each. Individual light sources within set 82 preferably are distinguishable, e.g., by color or with their corresponding processors causing them to use different modulation parameters (such as in any of the ways described in the '119 application), e.g., in a predetermined manner or based on one or more of the control signals 34 and/or one or more configuration signals 85.

In the preferred embodiments, the configuration signals 85 are used to set any or all of the parameters discussed above, e.g., whether the block widths are fixed or variable, whether the word lengths are fixed or variable, whether the blocks overlap each other, etc. In such embodiments, the configuration signals 85 preferably are set by the user (typically on the encoding side and input through a user interface) and/or by the security service (and provided by its server 35).

In the current embodiment, individual light-sensing circuits within set 84, or the processors associated with them, are configured (e.g., in a predetermined manner or based on one or more control signals 34 and/or one or more configuration signals 85) to process light received from just one of the light sources (e.g., as also described in the '119 application), filtering out light received from the non-selected light sources. By dynamically controlling the light-sensing circuits within set 84, the data words broadcast by the set 82 of light sources are rearranged according to patterns that are able to change in real time. That is, in the current embodiment, each light-sensing circuit 84 is, in real time, provided with a code telling it which light source 82 to receive from, with each light-sensing circuit 84 receiving from a different light source 82 at any given time, and with the pattern corresponding to the scramble code 39.

In a more-specific embodiment, each of the sets 82 and 84 is configured as a two-dimensional array 95 of elements 97 (i.e., light sources or light sensors, respectively), as shown in FIG. 7. According to this embodiment, a two-dimensional array 95 of light sources 82 is disposed in parallel to a two-dimensional array 95 of light sensors or light-sensing circuits 84, so that each light-sensing circuit 84 is capable of receiving light from all of the light sources 82. However, using, e.g., any of the techniques described in the '119 application, the output from each sensor 84 is filtered so as to pass only the signal from the single light source 82 that has been designated to such sensor 84. Again, these designations preferably can be changed on-the-fly in real time, as specified by the control signals 34 and/or the configuration signals 85.

Different variations in the above-described embodiments also are contemplated. For instance, in certain embodiments individual light sources 82 are driven by distinct data words within the input data provided on input line 75. In alternate embodiments, individual light sources 82 are driven by partially overlapping data words within such input data, thereby providing some amount of redundancy, e.g., for error detection and/or correction.

Similarly, in certain embodiments individual light-sensing circuits 84 include a single light sensor and a single processor that filters the received light from such light sensor to isolate the signal from a single light source 82. In alternate embodiments, individual light-sensing circuit(s) 84 include a single processor for multiple light sensors, and that single processor isolates the signals from multiple light sources 82 by processing the signals provided from such multiple light sensors.

The foregoing system can be used to scramble word lengths of any size. In the preferred embodiments, each light source 82 modulates and broadcasts its assigned word, and then a new block of data, containing a word for each light source 82, is supplied in parallel to the set of light sources 82, each then modulating and broadcasting the new data word assigned to it, and so on.

System Environment.

Generally speaking, except where clearly indicated otherwise, all of the systems, methods, modules, components, functionality and techniques described herein can be practiced with the use of one or more programmable general-purpose computers. Such devices (e.g., including any of the electronic devices mentioned herein) typically will include, for example, at least some of the following components coupled to each other, e.g., via a common bus: (1) one or more central processing units (CPUs); (2) read-only memory (ROM); (3) random access memory (RAM); (4) other integrated or attached storage devices; (5) input/output software and circuitry for interfacing with other devices (e.g., using a hardwired connection, such as a serial port, a parallel port, a USB connection or a FireWire connection, or using a wireless protocol, such as radio-frequency identification (RFID), any other near-field communication (NFC) protocol, Bluetooth or a 802.11 protocol); (6) software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; (7) a display (such as a a liquid crystal display, an organic light-emitting display, a polymeric light-emitting display or any other thin-film display); (8) other output devices (such as one or more speakers, a headphone set, a laser or other light projector and/or a printer); (9) one or more input devices (such as a mouse, one or more physical switches or variable controls, a touchpad, tablet, touch-sensitive display or other pointing device, a keyboard, a keypad, a microphone and/or a camera or scanner); (10) a mass storage unit (such as a hard disk drive, a solid-state drive, or any other type of internal storage device); (11) a real-time clock; (12) a removable storage read/write device (such as a flash drive, a memory card, any other portable drive that utilizes semiconductor memory, a magnetic disk, a magnetic tape, an opto-magnetic disk, an optical disk, or the like); and/or (13) a modem (e.g., for sending faxes or for connecting to the Internet or to any other computer network). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, one or more server boxes, workstations, personal (e.g., desktop, laptop or tablet) computers and/or smaller computers, such as personal digital assistants (PDAs), wireless telephones (e.g., smartphones) or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality and/or for implementing the modules and components of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise. For instance, a server generally can (and often will) be implemented using a single device or a cluster of server devices (either local or geographically dispersed), e.g., with appropriate load balancing. Similarly, a server device and a client device often will cooperate in executing the process steps of a complete method, e.g., with each such device having its own storage device(s) storing a portion of such process steps and its own processor(s) executing those process steps.

Additional Considerations.

As used herein, the term "coupled", or any other form of the word, is intended to mean either directly connected or connected through one or more other elements or processing blocks, e.g., for the purpose of preprocessing. In the drawings and/or the discussions of them, where individual steps, modules or processing blocks are shown and/or discussed as being directly connected to each other, such connections should be understood as couplings, which may include additional steps, modules, elements and/or processing blocks. Unless otherwise expressly and specifically stated otherwise herein to the contrary, references to a signal herein mean any processed or unprocessed version of the signal. That is, specific processing steps discussed and/or claimed herein are not intended to be exclusive; rather, intermediate processing may be performed between any two processing steps expressly discussed or claimed herein.

As used herein, the term "attached", or any other form of the word, without further modification, is intended to mean directly attached, attached through one or more other intermediate elements or components, or integrally formed together. In the drawings and/or the discussion, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Unless otherwise clearly stated herein, all relative directions (e.g., left, right, top, bottom, above, below) mentioned herein in relation to an article are from the perspective of the article itself and, therefore, are consistent across different views.

Where a specific value is mentioned herein, such a reference means that value or substantially that value, which includes values that are not substantially different from the stated value, i.e., permitting deviations that would not have substantial impact within the identified context. For example, stating that a continuously variable signal level is set to zero (0) would include a value of exactly 0, as well as small values that produce substantially the same effect as a value of 0.

In the preceding discussion, the terms "operators", "operations", "functions" and similar terms refer to method or process steps or to hardware components, depending upon the particular implementation/embodiment.

In the event of any conflict or inconsistency between the disclosure explicitly set forth herein or in the accompanying drawings, on the one hand, and any materials incorporated by reference herein, on the other, the present disclosure shall take precedence. In the event of any conflict or inconsistency between the disclosures of any applications or patents incorporated by reference herein, the disclosure most recently added or changed shall take precedence.

For purposes of the present disclosure, any explicit or implicit reference to any data items being included within the same database record means that such data items are linked together or logically associated with each other. Also, except to the extent clearly and expressly indicated to the contrary, references herein and/or in the accompanying drawings to information being included within a database, or within different databases, are not to be taken as limiting;

rather, such references typically are intended to simplify and/or more clearly illustrate the subject discussion, and in alternate embodiments any or all of the referenced information can be distributed across any number of database structures, as is well-understood in the art.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In the above discussion, certain methods are explained by breaking them down into steps listed in a particular order. Similarly, certain processing is performed by showing and/or describing modules arranged in a certain order. However, it should be noted that in each such case, except to the extent clearly indicated to the contrary or mandated by practical considerations (such as where the results from one step are necessary to perform another), the indicated order is not critical but, instead, that the described steps and/or modules can be reordered and/or two or more of such steps (or the processing within two or more of such modules) can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

In the discussions above, the words "include", "includes", "including", and all other forms of the word should not be understood as limiting, but rather any specific items following such words should be understood as being merely exemplary.

Several different embodiments of the present invention are described above and/or in any documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof as limited solely by the claims appended hereto.

What is claimed is:

1. A data-coding apparatus, comprising:
   (a) a data-input line for receiving input data;
   (b) a data scrambler that includes:
      (i) a plurality of light sources, coupled to the data-input line and modulated in accordance with the input data, and
      (ii) a plurality of light sensors that receive light from the light sources; and
   (c) at least one light-sensing processor coupled to the light sensors and configured so as to selectively isolate light signals received from individual ones of the light sources based on at least one control signal input into said data scrambler,
   wherein said at least one light-sensing processor is dynamically controlled by said at least one control signal so as to rearrange words within the input data according to patterns that change in real time.

2. A data-coding apparatus according to claim 1, wherein the light sources are light-emitting diodes.

3. A data-coding apparatus according to claim 1, wherein different ones of the light sources are modulated using different modulation parameters, and wherein said at least one light-sensing processor selectively isolates said light signals received from said individual ones of the light sources also based on said different modulation parameters.

4. A data-coding apparatus according to claim 1, wherein different ones of the light sources emit light of different colors, and wherein said at least one light-sensing processor selectively isolates said light signals received from said individual ones of the light sources also based on said different colors.

5. A data-coding apparatus according to claim 1, wherein said plurality of light sources is configured as a first two-dimensional array, and wherein said plurality of light sensors is configured as a second two-dimensional array that is parallel to the first two-dimensional array.

6. A data-coding apparatus according to claim 1, further comprising a serial-to-parallel converter having an input coupled to the data-input line and an output coupled to the plurality of light sources.

7. A data-coding apparatus according to claim 1, further comprising a parallel-to-serial converter having an input coupled to the at least one light-sensing processor.

8. A data-coding apparatus according to claim 1, further comprising a configuration-signal input line for receiving a configuration signal that specifies at least one of block width or word length used by said data scrambler.

9. A data-coding apparatus according to claim 1, wherein said plurality of light sources includes at least 50 of said light sources, and wherein said plurality of light sensors includes at least 50 of said light sensors.

10. A data-coding apparatus according to claim 1, further comprising a format converter: (a) having an input coupled to the data-input line and an output coupled to the plurality of light sources, (b) that divides the input data into data blocks which are then provided to and processed by the data scrambler.

11. A data-coding apparatus according to claim 10, wherein said data blocks have different sizes.

12. A data-coding apparatus according to claim 11, wherein said different sizes are specified by an input configuration signal.

13. A data-coding apparatus according to claim 10, wherein said data blocks are nonoverlapping.

14. A data-coding apparatus according to claim 1, wherein a light-sensing circuit, comprising at least one of said plurality of light sensors and said at least one light-sensing processor, is dynamically controlled according to patterns that change in real time.

15. A data-coding apparatus according to claim 1, wherein an output from each of said plurality of light sensors is filtered so as to pass only a signal received from a single one of said plurality of light sources.

16. A data-coding apparatus according to claim 15, wherein designations of the light sources to the light sensors are changed on-the-fly in real time, as specified by at least one input control signal.

* * * * *